United States Patent [19]

Taylor

[11] 4,224,383
[45] Sep. 23, 1980

[54] RECHARGEABLE BATTERY PACK

[75] Inventor: Stephen Taylor, South Farmingdale, N.Y.

[73] Assignee: Power-Lite Industries, Inc., North Babylon, N.Y.

[21] Appl. No.: 972,807

[22] Filed: Dec. 26, 1978

[51] Int. Cl.² ............................................. H01M 14/00
[52] U.S. Cl. ............................................. 429/7; 429/53; 429/92; 429/149
[58] Field of Search ............................. 429/53, 91–93, 429/7, 149, 150, 156

[56] References Cited

U.S. PATENT DOCUMENTS

| | | | |
|---|---|---|---|
| 3,100,862 | 8/1963 | Collier | 429/156 X |
| 3,460,995 | 8/1969 | Webb | 429/93 |
| 3,600,234 | 8/1971 | Massie, Jr. | 429/93 |
| 3,996,579 | 12/1976 | Dahl | 429/93 X |
| 4,020,243 | 4/1977 | Oldford | 429/93 |
| 4,117,203 | 9/1978 | Sjogren | 429/7 |
| 4,124,739 | 11/1978 | Sudworth | 429/93 X |
| 4,136,234 | 1/1979 | Fritts | 429/91 X |
| 4,143,212 | 3/1979 | Yeno | 429/91 X |

Primary Examiner—Charles F. LeFevour
Attorney, Agent, or Firm—Stephen Taylor

[57] ABSTRACT

A rechargeable battery pack includes at least a power cell and a substantially sealed housing adapted to permit venting therefrom of increased internal housing pressure while normally maintaining a substantially air-tight closure. A novel charge status indicator for integration with the battery pack provides a positive indication of the substantially fully charged status of the power cell.

13 Claims, 3 Drawing Figures

RECHARGEABLE BATTERY PACK

The present invention relates to rechargeable batteries and to charge status indicators used during recharging of the batteries for indicating the presence of a full charge thereon.

It is an object of the present invention to provide a novel construction for a rechargeable battery pack.

It is another object of the present invention to provide a novel construction for a battery pack including a substantially air-tightly sealed housing and means for permitting the release of pressure from the interior of the housing without destroying the substantially air-tight seal thereof.

It is a further object of the present invention to provide a rechargeable battery pack including an integrated charge status indicator for indicating the presence of a full charge during recharging of the battery pack.

It is still another object of the present invention to provide a charge status indicator of particularly simple construction utilizing a minimum number of components and which provides a positive indication of a fully charged condition of a battery during recharging of the same.

These and further objects, features and advantages of the present invention will be more fully appreciated by reference to the following detailed description of presently preferred, but nonetheless illustrative, embodiments in accordance with the present invention when taken in conjunction with the accompanying drawings, wherein.

DETAILED DESCRIPTION OF THE PREFERRED EMBODIMENTS

Figure 1:
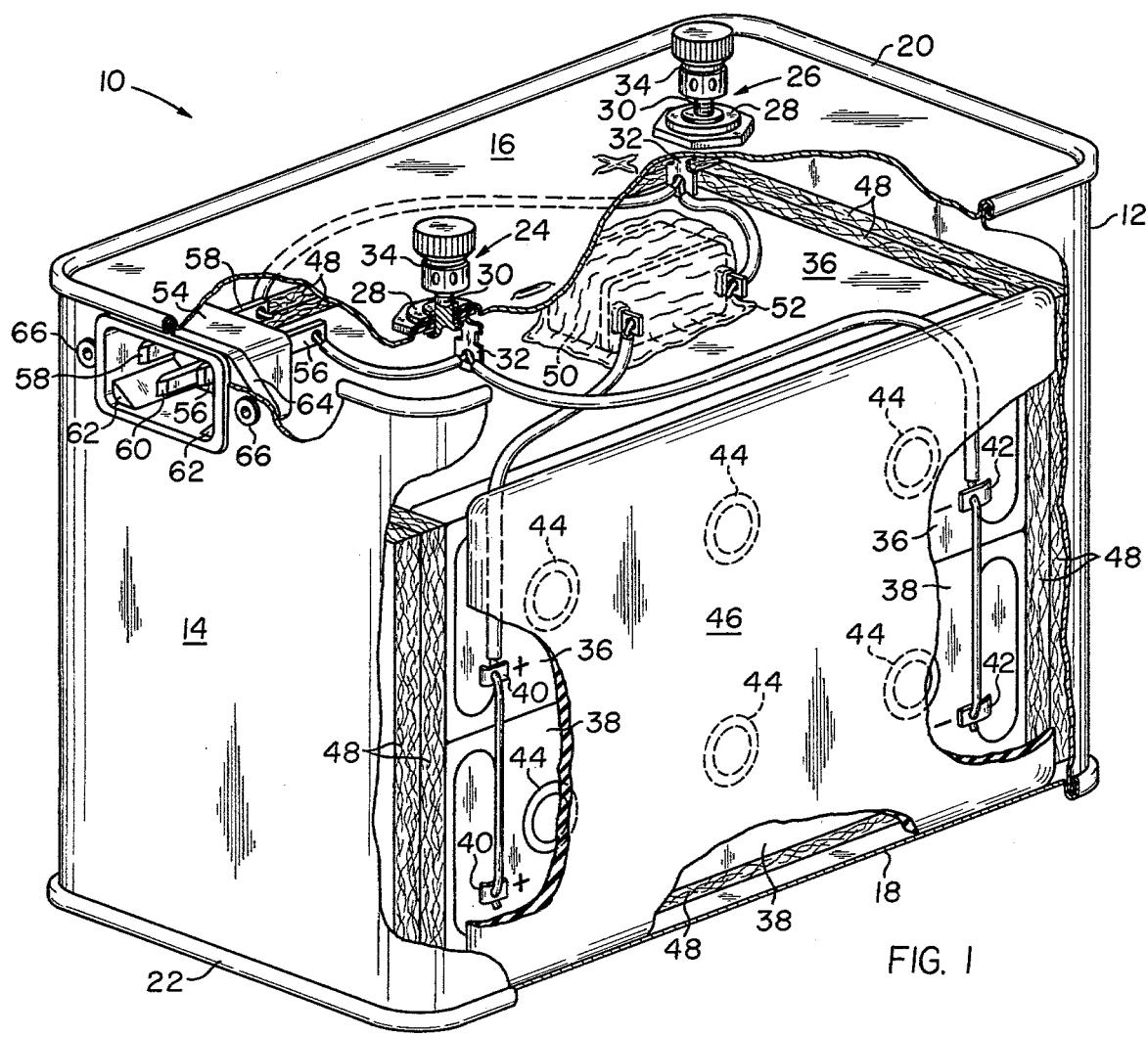
FIG. 1 is a perspective view, partially broken away, of a rechargeable battery pack constructed in accordance with the present invention.
Figure 2:
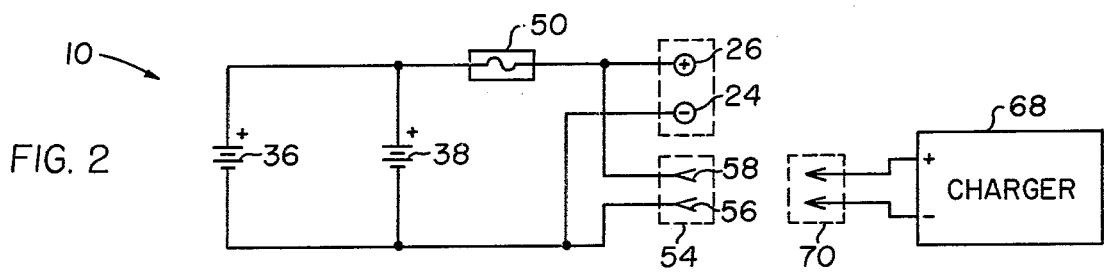
FIG. 2 is an electrical schematic diagram of the rechargeable battery pack of FIG. 1 showing its connection with a battery charger.

Referring now to the drawing, there is depicted in FIG. 1, and schematically in FIG. 2, a rechargeable battery pack, designated by the general reference numeral 10, in accordance with the present invention. A housing or canister 12 comprising a continuous sidewall 14 and a pair of end members herein referred to as the top 16 and bottom 18 may be constructed so as to substantially conform the housing in size and shape to that of conventional dry lantern batteries to enable the substitution of the rechargeable pack 10 thereof. In this manner lamp heads and the like normally used in conjunction with such conventional non-rechargeable lantern batteries and which draw significant electric currents therefrom necessitating their frequent replacement may be utilized instead with the inventive battery pack 10 which is advantageously repeatedly rechargeable.

The top 16 and bottom 18 are secured to opposite ends of the sidewall 14 so as to render the resulting housing 12 substantially air-tightly closed or sealed. A typical construction material for the housing 12 is aluminum or other metallic substance which is reasonably durable although it should be recognized that the actual material used is not crucial so long as a substantially air-tight seal is attainable. As suggested in FIG. 1, the sealed securement may be effected by interleaving or folding the engaged peripheral edges of the housing members and thereafter crimping the same together to form upstanding ridges 20, 22 along the top and bottom marginal edges, respectively, of the housing 12. The lower or supporting ridge 22 may be utilized to facilitate and maintain placement or positioning of the battery pack 10 in an operating environment while the upper ridge 20 provides a lip to which a conventional lamp head may be attached or secured for use with the battery pack 10.

A pair of terminals generally designated 24 and 26 and carried on the housing top 16 provide connection or tie points on the exterior of the housing 12 through which electrical equipment may communicate with the battery pack 10 for establishing an electrical connection therewith. Each terminal is of substantially conventional construction, comprising a dielectric washer or grommet 28 through which a threaded conductive terminal post 30 is journalled to prevent shorting contact of the post 30 with the housing top 16 as the terminal post extends therethrough and to maintain the integrity of the housing closure or seal. Each terminal post 30 terminates within the housing 12 in a lug 32 for electrical connection with the internal power cells soon to be discussed, while a threaded cap 34 is provided for rotative engagement on each projecting terminal post 30 to facilitate an external electrical connection therewith.

Rechargeable power cells 36, 38 provide the direct current electric potential associated with the battery pack 10. Each of the power cells 36, 38 is of generally rectangular configuration and carries positive and negative leads 40, 42, respectively, extending from the top surface of the cell for electrical connection therewith. Although the power cells 36, 38 are shown connected to one another in parallel electrical relation so as to increase the current capacity provided by a single cell, those skilled in the art will readily recognize that the cells 36, 38 could alternatively be series-connected for providing an increased voltage potential of the battery pack 10. The provision of either series or parallel-connected power cells 36, 38 will depend, of course, upon the current and voltage requirements of the end user and the electrical capacity of each cell.

The rechargeable power cells 36, 38 are preferably of the type having a gelled electrolyte which permits the same to be utilized in virtually any orientation or position since the electrolyte does not flow away from the internal plates even when the cell is tilted or inverted. The power cells 36, 38 are provided with pressure release valve means 44 on their top surfaces to permit the release of gasses internally produced during operation of the cells although the valve means 44 are adapted to prevent the escape of the gelled electrolyte therethrough. It should, of course, be understood that the power cells 36, 38 as described are well known in the art and it is not intended that the same, in and of themselves, form any part of the present invention but instead merely constitute a particular power cell construction which may be utilized in the novel arrangement of the battery pack 10 herein taught.

The power cells 36, 38 are so disposed within the housing 12 that the same lie adjacently on their sides having their top surfaces positioned in opposed or facing relation to the housing sidewall 14. In order to prevent shorting contact of the power cell leads 40, 42, which extend from the top surface of the cells, with the interior of the sidewall 14, a dielectric spacer 46 is interposed to serve as an insulating barrier therebetween. The spacer 46 may by way of example be fabricated of a suitably sized and configured plate of tempered masonite which may for convenience assume a generally rectangular shape. The marginal edges of the spacer 46 may be bevelled or otherwise tapered to avoid an inadvertent creasing or rupture of the sidewall 14 by the edges thereof.

A shock absorbing or cushioning material designated 48 may be provided between the power cells 36, 38 and the bottom 18 and remaining sidewall portions of the housing 12 to protect the power cells against physical damage from shocks or forces transmitted through the housing. By advantageous selection of the cushioning material 48, the same may also serve to facilitate insulation of the power cells 36, 38 against temperature extremes existing in the operating environment outside of the housing 16. It has been found that polyethylene foam sheeting material of closed pore construction effectively combines both the cushioning and temperature insulating qualities desired although it is contemplated that other materials may be substituted therefor within the scope of the invention.

The negative leads 42 of the power cells 36, 38 are connected directly to the extending lug 32 of the negative terminal 24. The positive leads 40, however, are connected through a circuit breaker 50 to the lug 32 of the positive terminal 26. The series-connected circuit breaker 50 is operable to interrupt the connection of the power cell leads 40 and the positive terminal 26 for preventing short-circuit damage to the power cells 36, 38 and may be thermally activated so that the same automatically resets to reconnect the leads 40 to the terminal 26 after a predetermined period of time in which its internal contacts cool. Since the gasses internally produced by the power cells 36, 38 during their operation and released into the interior of the housing 12 through the valve means 44 may be inflammable or explosive in nature, the circuit breaker 50 is preferably fully encapsulated with a fluid-impervious sealing material 52 such as tar to close the interior thereof against the released gasses within the housing 12 and thereby prevent their contact with sparks which might be produced by arcing as the circuit breaker's internal contacts open and close.

As seen in FIG. 1, the circuit breaker 50 may conveniently be secured to the side panel of the power cell 36 in a clearance area between the power cell 36 and the housing top 16. This clearance area or space is intentionally provided to accommodate the circuit breaker 50 as well as the interior portions of the terminals 24, 26, point-to-point wiring and additional components hereinafter described. Such clearance additionally facilitates thermal insulation of the power cells 36, 38 from temperature extremes exterior to the housing 12. It should further be noted that in order to prevent possible shifting or movement of the power cells 36, 38 into this clearance space when the housing 12 is inverted from the orientation shown in FIG. 1, at least a portion of this space may be filled or otherwise provided between the cell 36 and housing top 16 with cushioning or shock-absorbing material 48 such as that interposed between the power cells 36, 38 and the housing bottom 18 and sidewall 14.

A receptacle 54 mounted on and affixed to the sidewall 14 is provided to supply a convenient electrical connection point to the battery pack 10 for a charging device used to recharge the power cells 36, 38 to their normal operating voltage as and when required. The receptacle 54 is provided with at least two contacts 56, 58 electrically connected with the respective battery pack terminals 24, 26 for communication with the power cells. A third contact 60 may be included in the receptacle 54 for communication with the housing 12 or for common connection with one of the other contacts 56, 58, or the contact 60 may remain unconnected, used merely to effectively "polarize" the receptacle so that a mating plug can be coupled thereto with only a single orientation. Non-symmetrically arranged polarizing keys 62 may additionally or alternatively be provided on the receptacle 50 for this orienting purpose so as to assure proper electrical connection of a charging device to the positive and negative power cell leads 40, 42.

To mount the receptacle 50 on the housing 12, an appropriately-sized opening closely conforming to the exterior dimensions and configuration of the inserted receptacle wall is defined in the sidewall 14 at the clearance space or area adjacent the container top 16. A flange 64 on the receptacle abuts the interior of the sidewall 14 adjacent the opening and is preferably provided with means for maintaining the integrity of the substantially air-tight closure or seal of the housing 12 between the receptacle 50 and the sidewall opening. Accordingly, hot tar may be brushed across the flange 64 immediately prior to mounting of the receptacle 50 since when cool the tar presents an essentially fluid-impervious hardened barrier sufficient to maintain the seal.

Securement of the charging receptacle 54 on the sidewall 14 may be completed by passing rivets 66 through the housing sidewall and the receptacle mounting flange 64 to positively secure the same against relative movement which could rupture the substantially air-tight seal. Although suitable alternative means can be employed in lieu of the rivets 66 for fixing the receptacle on the sidewall, the use of rivets has been found to advantageously permit necessary venting of the interior of the housing 12 while maintaining the integrity of the substantially air-tight closure or seal thereof.

It will be recalled that the power cells 36, 38 herein described release, by way of the pressure relief valve means 44, gasses which are produced within the cells as a byproduct of their internal voltage-generating reactions. The release of these gasses from the power cells into the interior of the housing 12 results in an increase of pressure within the housing which has no means of release therefrom due to its substantially air-tight closure. As understood, however, the passage of the rivets 66 through the receptacle flange 64 and the sidewall 14 provides sufficient clearance about the rivets 66 to permit, at only slightly increased internal housing pressure, the passage of the molecules of the gasses released from the power cells 36, 38 along such clearance and out of the housing 12. At the same time, this clearance is insufficient to allow a general communication of the atmosphere within and exterior to the housing. As a consequence, the substantially air-tight closure of the housing is maintained while means are provided for the release of increased internal housing pressure resulting from the production and release of gasses from the power cells without the necessity of including within the structure of the rechargeable battery pack 10 any manner of complex valving arrangement.

The FIG. 2 schematic representation of the battery pack 10 of FIG. 1 illustrates its manner of connection with a charging device 68 having a plug 70. The plug 70 is configured for entry into and engagement with the battery pack receptacle 54 for recharging the power cells 36, 38 thereof to their normal operating voltage. Typically, an indicator means (not shown) of some sort is provided on or in conjunction with the charging device 68 to permit the user to ascertain the presence of a full charge on the unit connected to the charging device. Conventional charge indicators for this purpose generally comprise a series-connected lamp and resistor electrically interposed between the voltage source of the charging device 68 and the unit being charged, as for example the inventive battery pack 10. The indicator lamp is initially lit when the battery pack voltage is low and during the recharging operation is observed to dim until fully extinguished when the battery pack approaches a substantially fully charged condition. However, charge indicators of this type are notoriously inaccurate since the lamps thereof are known to become fully extinguished at some point prior to the presence of a full charge on the battery pack. As a consequence, it is difficult to be certain of the earliest practical moment at which the battery pack under charge can be disconnected from the charging device 68 leaving a full charge thereon.

Figure 3:
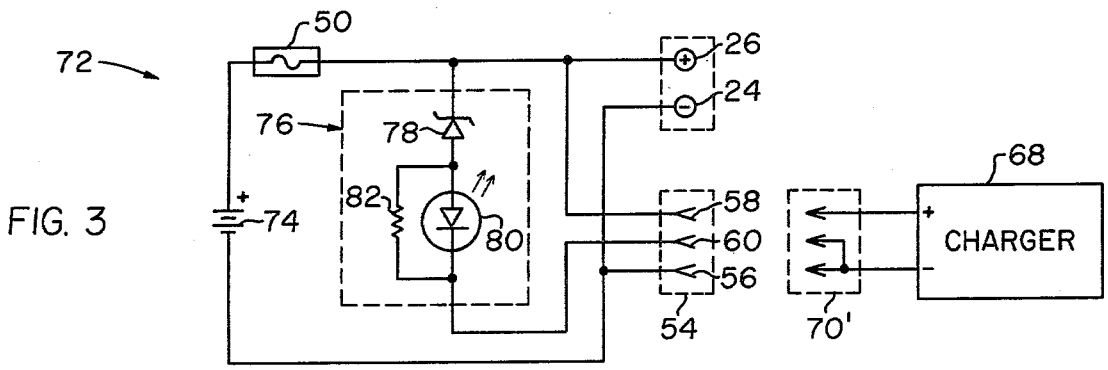
FIG. 3 is an electrical schematic diagram of a rechargeable battery pack having a built-in charge status indicator constructed in accordance with the teachings of the present invention.

FIG. 3 schematically illustrates a second embodiment of a rechargeable battery pack according to the present invention. The battery pack there shown and designated by the general reference numeral 72 may assume the general arrangement of internal structures and elements described above with regard to the embodiment of FIGS. 1 and 2. Thus, although only a single power cell 74 is schematically shown in FIG. 3, the same may actually comprise a plurality of cells connected in series or parallel arrangement as in the previous embodiment. A circuit breaker 50 and terminals 24, 26 are likewise included in the battery pack 72. The physical layout and details of the rechargeable battery pack 72 may be substantially identical with that of the battery pack 10 shown in FIG. 1 and as a consequence a detailed description of such common arrangement would be redundant and superfluous and is omitted.

However, the battery pack 72 further includes as an integrated part thereof a novel charge indicator circuit generally designated 76 and which is designed to overcome the disadvantages inherent in the operation of conventional prior art charge indicators while utilizing a minimum number of component parts. Thus, the charge status indicator 76 comprises a zener diode 78 in series electrical connection with a light emitting diode 80. The zener diode 78 has its cathode connected to the positive terminal 26 of the battery pack 10 so as to reverse-bias the zener diode 78 and its anode is connected to the anode of the light emitting diode 80. The cathode of the light emitting diode is connected to the otherwise unused third contact 60 of the battery pack receptacle 54 described above with reference to FIG. 1, the first two contacts 56, 58 constituting the negative and positive charging connections, respectively, to the battery pack 72. Thus, the zener diode 78 is reverse-biased with respect to the power cell 74 and relative to the light emitting diode 80 while the light emitting diode is forward-biased with respect to the power cells 74. Also seen in FIG. 1 is a resistor 82 in parallel electrical connection with the light emitting diode 80.

Still referring to FIG. 3, the charging device 68 used for recharging of the battery pack 72 is provided with a modified plug 70' for mating engagement with the receptacle 54. The modified plug 70' includes, in addition to the positive and negative contacts of the plug 70, a third contact 84 in common electrical connection with the negative output of the charger 68. Those skilled in the art will appreciate that the engagement of the plug 70' and receptacle 54 effects connection of the receptacle contacts 56 and 60 to place the charge status indicator 76 in parallel electrical connection with the battery pack 74. Thus, the charge status indicator 76 is connected with the power cell 74 for sampling the charge status thereof only during recharging of the battery pack 72 by the charging device 68. In this manner the charge indicator 76 is prevented from unnecessarily loading or draining of the power cell 74 in the course of normal use of the battery pack.

In operation, the light emitting diode 80 of the charge status indicator is illuminated only when the voltage of the power cell 74 is substantially equal to its normal operating voltage. This corresponds to a fully charged condition of the power cell. In other words, during recharging of the battery pack 72, the light emitting diode 80 remains unlit until the power cell is substantially fully charged. The charge status indicator 76 accordingly provides a positive indication of the charged status of the battery since when the light emitting diode 80 is lit, the charger 80 can be disconnected from the battery pack 72 and normal use of the battery pack resumed. As a consequence, recharging operations can be quickly and efficiently carried out since there is virtually no uncertainty as to the point at which full power cell voltage has been attained. The charge status indicator 76 thereby minimizes the recharging cycle and down time of the battery pack 72 to permit the same to be returned to service at the earliest possible time.

The breakdown voltage of the zener diode 78—i.e. the minimum voltage at which reverse current is permitted to flow therethrough—is selected to determine the power cell voltage at which the light emitting diode 80 is illuminated, and its selection is related to the normal operating voltage of the power cell 74 and the minimum conduction voltage which, when impressed across the forward-biased light emitting diode 80, causes light-emitting conduction thereof and below which voltage the same will not appreciably light. Based upon these two parameters, the zener diode breakdown voltage is selected to substantially equal the difference between the normal operating voltage of the power cell 74 and the minimum conduction voltage of the light emitting diode 80. When the recharging power cell 74 is substantially fully charged to its normal operating voltage, the light emitting diode 80 is illuminated to provide a positive indication of the charged status of the battery pack. The light emitting diode 80 will not, however, light until the normal operating voltage of the power cell 74 has been substantially attained.

Of course, it will be recognized by those skilled in the art that the charge status indicator 76 may be utilized as either an integrated part of or separately in conjunction with virtually any rechargeable battery pack construction. Alternatively, the charge indicator 76 may be included within a particular charging device such as the charger 68. The provision of a positive indication of the charged status of a rechargeable power cell is a timesaving and efficiency-promoting advantage to those who regularly use rechargeable battery packs. The novel charge status indicator 76 of the present invention provides these and other advantages in a construction utilizing a minimum number of components for trouble-free operation and simple and inexpensive fabrication.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A rechargeable battery pack,
a housing having a continuous sidewall and a top and a bottom secured to opposite ends of said sidewall to provide a substantially air-tight closure of said housing,
a pair of gelled electrolyte rechargeable power cells each including a top surface having means for electrical connection with the cell and being electrically interconnected with the other of said power cells at said connection means, and pressure relief means on each said cell for the release therefrom of internally produced gas, said power cells being adjacently positioned in said housing so as to dispose the top surfaces of said cells in facing relation to said housing sidewall,
dielectric spacer means to space said power cell connection means from shorting contact with the interior of said sidewall,
circuit breaker means in said housing in series connection with said power cells and operable to prevent short-circuit damage to said cells,
a receptacle on said housing and electrically connected with said power cells for enabling the connection of a charger to said battery pack for recharging said power cells,
means securing said receptacle to said housing including means to permit the venting from said substantially air-tight housing of gas released into the interior thereof by said power cell so as to prevent the rupture of said housing due to internal accumulation of the gas and charge status indicating means in said housing in electrical communication with said power cells and said receptacle for connection with a charger during recharging of the power cells to indicate the presence of a full charge on said cells, said charge status indicating means comprising a reverse-biased zener diode in series electrical connection with a forward-biased light emitting diode for illumination only when said power cells are substantially fully charged.

2. A rechargeable battery pack according to claim 1, said circuit breaker means being fully encapsulated to seal the interior thereof against the entry of gas released from said power cells into the interior of the housing.

3. A rechargeable battery pack according to claim 1, terminal means on said container and in electrical communication with said power cells for establishing an external electrical connection to said battery pack.

4. A rechargeable battery pack according to claim 1, shock absorbing means spacing said power cells from the interior of said housing for cushioning said power cells against physical damage thereto and for facilitating insulation of the same against ambient temperature extremes within which the battery pack is used.

5. A rechargeable battery pack according to claim 4, said shock absorbing means comprising material of closed pore construction interposed between said power cells and the interior of said housing.

6. A rechargeable battery pack according to claim 1, said charge status indicating means further comprising a resistor in parallel electrical connection with said light emitting diode.

7. A rechargeable battery pack,
a housing,
at least one rechargeable power cell in said housing having a normal operating voltage when fully charged,
receptacle means on said housing and electrically communicating with said power cell for connection with a charger with which the power cell is rechargeable when the voltage of said power cell is less than said normal operating voltage,
and charge status indicating means in said housing for parallel electrical connection with said power cell during recharging thereof to provide a positive indication of the presence of said normal operating voltage on said power cell said charge status indicating means including a forward-biased light emitting diode for light emitting conduction when an electric current is passed therethrough,
and a reverse-biased zener diode in series electrical connection with said light emitting diode and having a breakdown voltage selected to that said zener diode permits an electric current to flow through the same and through said light emitting diode for light emitting conduction thereof only when the voltage impressed across said charge status indicating means is substantially equal to said normal operating voltage of the power cell.

8. A rechargeable battery pack according to claim 7, said charge status indicating means being electrically connected between said power cell and said receptacle means so that said indicating means is connected in parallel relation to said power cell for positively indicating the presence of a full charge thereon only when a charger is connected to said battery pack at said receptacle means.

9. A rechargeable battery pack according to claim 7, said charge status indicating means further including a resistor in parallel electrical connection with said light emitting diode to facilitate the flow of electric current through said charge status indicating means for lighting said light emitting diode when the voltage impressed across said charge status indicating means is substantially equal to said normal operating voltage.

10. A rechargeable battery pack according to claim 7, terminal means on said housing and electrically communicating with said power cell for the establishment of an external electrical connection with said battery pack at said terminal means.

11. A rechargeable battery pack according to claim 7, circuit breaker means in said housing in series electrical connection with said power cell for operatively protecting the power cell against overloading and being self-resetting after a predetermined period of time.

12. A rechargeable battery pack according to claim 7 wherein said housing is sealed substantially air-tightly, means securing said receptacle to said housing including means to permit the venting from said substantially air-tightly sealed housing of internal pressure which might otherwise accumulate therein and rupture said housing.

13. A rechargeable battery pack according to claim 12,
said power cell having a gelled electrolyte that emits a gas during operation,
and means on said housing to permit the release of the emitted gas from the interior of said housing.

* * * * *